United States Patent [19]
Zumbach

[11] 3,760,264
[45] Sept. 18, 1973

[54] METHOD AND DEVICE FOR MEASURING MINIMA OR MAXIMA OF THE THICKNESS OF A DIELECTRIC LAYER ON AN ELECTRIC CONDUCTOR

[76] Inventor: Bruno Zumbach, CH-2552 Orpund, Grunemattstr. 8, Switzerland

[22] Filed: Apr. 22, 1971

[21] Appl. No.: 136,719

[30] Foreign Application Priority Data
Apr. 24, 1970 Germany............... P 20 20 122.3

[52] U.S. Cl........... 324/34 TK, 33/174 L, 324/34 E
[51] Int. Cl.............................................. G01r 33/00
[58] Field of Search.................... 324/34 E, 34 TK, 324/40, 61 R, 61 P, 34 R; 33/174 L

[56] References Cited
UNITED STATES PATENTS
2,898,550   8/1959   Fisher.................................. 324/40

FOREIGN PATENTS OR APPLICATIONS
122,935   12/1946   Australia...................... 324/34 TK

*Primary Examiner*—Robert J. Corcoran

[57] ABSTRACT

This invention relates to a method and a device for measuring minima or maxima of the thickness of a dielectric layer on electric conductor means having prominent portions, wherein a measuring head scans the surface of the layer and minima or maxima of the thickness of the dielectric layer are detected, stored and indicated. Several minima or maxima may simultaneously be indicated and compared with each other whereby it is possible to determine the general position of the conductor means in a dielectric and absolute extremum values of the thickness.

8 Claims, 6 Drawing Figures

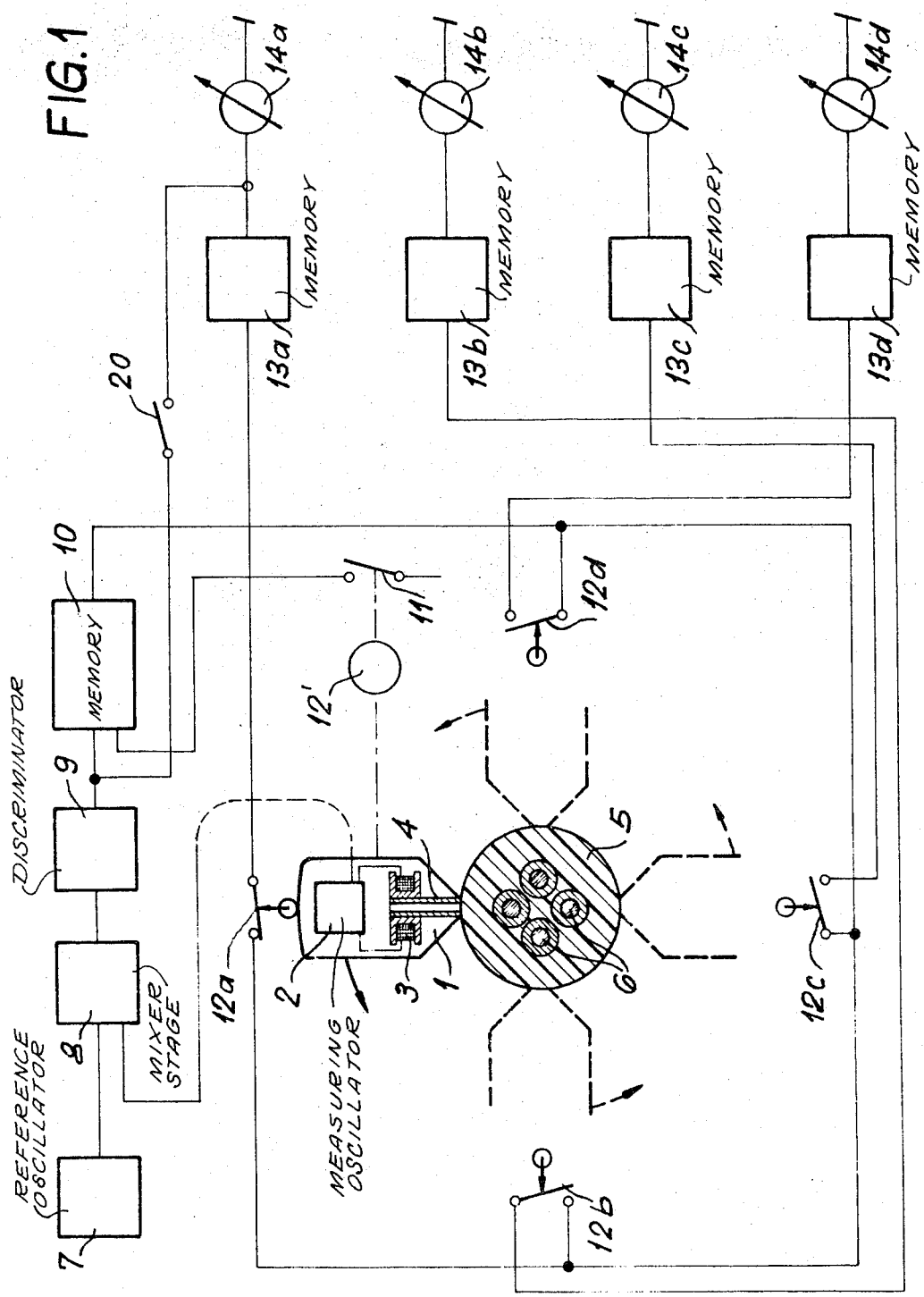

Patented Sept. 18, 1973 3,760,264
2 Sheets-Sheet 2
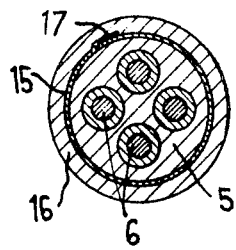
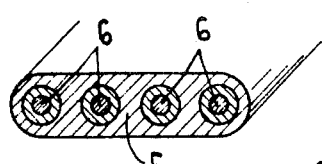
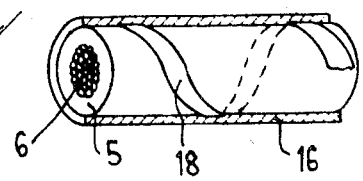
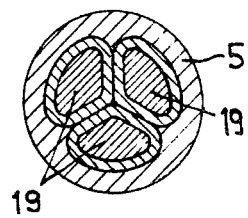
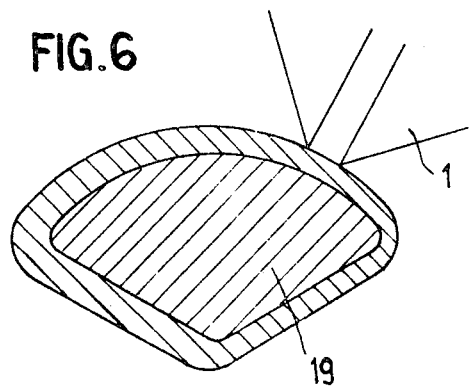
INVENTOR
BY
15.4.71

METHOD AND DEVICE FOR MEASURING MINIMA OR MAXIMA OF THE THICKNESS OF A DIELECTRIC LAYER ON AN ELECTRIC CONDUCTOR

The present invention relates to a method and device for measuring the thickness of a dielectric layer on an electric conductor having a non-cylindric external surface or on several stranded helically running conductors of a cable or the like longitudinally moved relatively to a measuring pick-up.

There are known various methods and apparatus for measuring the thickness of layers, especially the thickness of an insulating layer on wires or cables. However, the known methods and appratus are confined generally to a comparison checking the thickness of the layer along the circumference of the object and from differences of the thickness of the layer on different spots there is concluded an eccentricity of a single cylindric conductor in the cable or wire. These measuring methods and appratus are inoperable, however, if differences of the thickness of the layer are not due to an eccentricity of a conductor or conductor system in the insulation but to a non-cylindric shape of the conductor. The classical case of a non-cyclindric external surface of the conductor system is a multicore stranded power cable, the individual cable cores of which are housed in an insulating cover having a cylindric external surface. In such a cable there are considerable differences of the thickness between the external surface of the insulating cover and the outermost parts of the individual conductors. Therefore, even if the conductor system is placed absolutely symmetrically in the cover, during continuous mesurement along the circumference of the cable but also during measurement along a axial surface line of the continuously running cable there occur differences of the thickness of the layer and therewith differences of the ascertained measurement result, which differences say nothing in themselves of the eccentricity of the conductor system. Since during a continuous measuring whether along the circumference or along axial surface line of the cable having stranded conductors relatively quick fluctuations of the measurement result occur continuously and therewith oscillations on an indicating instrument such a measuring is practically unconscionable and inaccurate.

It is the object of the present invention to suggest a method and device, by means of which also on optionally shaped and stranded conductors or conductor systems the equability of the insulating layer can be checked reliably and simply.

The method according to the present invention is characterized in that the measuring pick-up slides at least over a part of the circumference of the object to be measured or over at least one pitch and lay, respectively, along a predetermined axial surface line of a cable and thereby measures the local extremum value, particularly a minimum of the thickness of the layer, and that extremum values occuring during measurement are stored in a memory and indicated.

Generally it will be a matter of indicating minima of the thickness of the layer, since it is desired to investigate whether or not in fact the required minimal thickness of the layer is throughout on hand. But at the same time the indication of extremum values ascertained in different places represents a statement whether or not the conductor or the conductor system is placed in the insulating cover symmetrically or asymmetrically. Since the extremum values are stored and indicated continuously or at least during a predetermined period of time the reading is simple. Preferably extremum values ascertained in different places simultaneously or successively may be stored by means of different memories and indicated simultaneously by means of associated indicating instruments, whereby a continuous comparison of these values and therewith a statement about the position of the conductor or conductor system is possible.

If the thickness of a layer on a bundle of stranded conductors, on a metallic armour running along a helix or the like must be ascertained it is sufficient to measure along a surface line of the object to be measured over at least one pitch and lay, of the helix structure of the conductor respectively, by means of a measuring pick-up whilst the object to be measured is running through in order to detect the extremum values in every case. The exact measurement of extremum values of the thickness of a layer on irregularly shaped conductors or conductor systems and on conductors having an irregularly bent surface, respectively, a measuring method is necessary or in any case advantageous, the sphere of action of which is locally as limited as possible, which method is therefore adapted to detect locally limited extremum values reliably.

For this purpose, especially in order to carry out the aforesaid method the invention proposes a measuring device having a measuring coil on which the conductor reacts according to the thickness of the layer and which is characterized in that in order to increase the resolving power for detecting extremum values the measuring coil includes a core, the end of which destined to be approached to the object to be measured projects from the coil.

Thus, the measuring field can be locally limited and concentrated compared with that of an without core coil, wherewith the resolving power of the measuring pick-up is sufficient for reliably detecting local extremum values.

Particulars of the invention will now be given in connection with the drawings, wherein:

FIG. 1 is a diagrammatic representation of the measuring device and

FIGS. 2 to 6 show several embodiments of objects to be measured.

The measuring device shown in FIG. 1 comprises a measuring head 1, wherein a measuring oscillator 2 is housed. A coil 3 which is a contributory determinant of the frequency of said oscillator serves as actual measuring coil, in which a tubule 4 made of "Ferroxcube" (trade-mark of the Valvo GmbH., Hamburg, Germany) or the like is inserted as a core. The one end of this tubule, the length of which is at least the double of the axial length of the coil 3 contacts the surface of the insulation 5 of the cable to be checked or is held at an exactly predetermined distance from this surface by means of a special bearing surface of the measuring head 1. The cable comprises four stranded conductors 6, each of which is separately insulated.

The output of the oscillator 2 and the output of a reference oscillator 7 are connected to the inputs of a mixer stage 8. From the output of the mixer stage 8 the frequency difference is applied to a discriminator 9. The output signal of the discriminator 9 is applied to an extremum value memory 10 which can be reset to zero by means of a switch 11. The peak memory 10 is adapted to store the peak voltage applied to its input during a mesuring period for a considerable time and to put out a signal equal or corresponding to said peak on the relatively low-impedance output. The output of the memory 10 is connected to a selector switch having the contacts 12a to 12d, which serves selectively for connecting the output of the peak memory 10 to the input of one of four measurement value memories 13a to 13d. The measurement value memories are adapted to be reset upon each new closure of the associated switch 12a to 12d and immediately are prepared for storing the new measurement value applied thereto. The outputs of the measurement value memories 13a to 13d are connected to indicating instruments 14a to 14d. By means of a position changing device 12' schematically shown the measuring head 1 may be shifted from the position shown in FIG. 1 into the three further positions as shown, namely two opposite horizontal positions and a lower vertical position, in order to check the continuously running cable along four axial surface lines at the bottom, on the top and, on both sides respectively. The switches 11 and 12 are coupled with said position changing device 12' for the measuring head 1 in such a manner that upon each shifting from one position to an other the switch 11 is temporary closed and resets the memory 10, and that for each of the four measuring positions of the measuring head 1 a predetermined switch 12a to 12d is closed. The position changing device for the measuring head 1 can be operated either by hand or automatically. Upon automatical operation the change takes place depending on the running speed of the cable to be checked in such a manner that there is measured along each axial surface line, i.e., in each measuring position of the measuring head at least over one length of a lay of the stranded conductors 6 so that for each measuring position a portion of each conductor will lay symmetrically in front of the core 4 as shown in FIG. 1 for the one conductor at least once.

As just indicated, the cable to be checked is running, e.g., from a manufacturing equipment through the measuring plant where the measuring head 1 contacts a predetermined surface line of the cable. Thereby the conductors 6 are alternatively positioned symmetrically in the electromagnetic field of the coil, which field is strongly concentrated by the core 4. By the reaction of the conductors 6 to this field the inductivity of the coil 3 and therewith the frequency of the measuring oscillator 2 is affected. Thereby it is evident that this influence is different in proportion as whether or not a conductor is exactly symmetrically in the field or not. Thus, the frequency of the oscillator 2 will fluctuate also upon symmetrical arrangement of the bundle of conductors 6 in the insulating cover 5. Upon interference of the frequency of the measuring oscillator 2 with the constant frequency of the reference oscillator 7 frequency fluctuations occur also at the output of the mixer stage 8 causing fluctuations of the output voltage of the discriminator 9. The highest peaks of the output voltage of the discriminator 9 are stored in the peak memory 10 and from its output applied to the meaurement value memory 13 through the closed switch 12. This measurement value memory stores the received magnitude and causes a permanent indication of the same on the instrument 14a. As already mentioned, the measuring head 1 remains in one of its measuring positions until at least one length of a helical lay of the bundle of stranded conductors 6 has passed the measuring head. If the bundle of conductors is lying asymmetrically in the insulating cover 5, the minimum thickness detected and indicated each time when a conductor is symmetrically in the measuring field will have different amplitudes. The peak memory 10 now stores the highest of these values and thus applies an extremum value through the closed measurement value memory to the associated indicating instrument 14, which indicates the minimum thickness of the insulating layer occuring in a surface line over a length of a lay. If the measurement along a surface line is brought to an end the measuring head is changed into the next measuring position. As mentioned, thereby the switch 11 is temporary closed and resets the peak memory 10. Simultaneously the hitherto closed switch 12a is opened and another switch 12 is closed. However, the measurement value memory thus disconnected from the peak memory stores the last fed magnitude and effects indication of the same. During the measurement in the new position of the measuring head 1 the aforesaid operations are repeated so that in a second measurement value memory 13 an extremum value of this measuring position is stored and indicated permanently. If all the four measurement positions are passed through for the first time all the indicating intruments 14 are indicating permanently a measurement value corresponding to the last extremum value ascertained in the associated measuring position of the measuring head 1. Consequently, the reading of the instruments 14 shows at every time whether or not differences of these extremum values have been found. If these differences exceed an allowable value or if one of the indicated values exceeds an allowable peak a correction can be made by adjusting the manufacturing equipment.

Corresponding measurements can be conducted on other objects. In FIG. 2, e.g., there is shown a cable in which the insulating cover 5 is surrounded by a shielding 15 and the latter is surrounded by a further insulating cover 16. The shielding 15 is overlapped at 17. This place 17 is especially critical since there are the greatest chances that the thickness of the external insulating layer 16 becomes too small. Hoever, also this cable is measured conventionally along four surface lines as illustrated in connection with the embodiment according to FIG. 1, with the difference that upon measuring on top of the overlapping shielding rims 17 a slight swivelling movement in circumferential direction is imparted to the measuring head 1 in order to detect the extremum value reliably, in this case the minimum value of the insulating thickness.

According to FIG. 3 there can be checked also cables in which a plurality of conductors 6 is arranged in a plane within a flat insulating body. In this case, however, the detection of extremum values, e.g., minimum values of the insulating thickness is no longer possible by directing the measuring head along an axial surface line of the insulating body, but the measuring head must be displaced across the one flat side or even around the insulating body. Thereby occuring extremum values are again stored and indicated as disclosed. Only one measurement value memory 13 with the associated indicating instrument 14 can be maintained connected which simply indicates the measured extremum value. But it is also possible during the measurement above each of the conductors 6 to connect a predetermined measurement value memory 13 and to indicate individually the ascertained values.

FIG. 4 shows a cable, the bundle of conductors 6 of which is lying within an insulating body 5 surrounded by a conductive armour 18 made of copper or iron. It is supposed that also here the external insulating cover 16 has throughout equal thickness. The checking is carried out in the manner as illustrated in connection with FIG. 1 by displacing the measuring head 1 for the time being along a predetermined axial surface line above at least one length of a lay and a pitch, respectively, of the armour 18. The extrem values are stored and indicated in the disclosed manner.

FIG. 5 shows a so-called sector cable having three conductors 19 which may be stranded or not. If the conductors are not stranded, the measuring head 1 is brought into three measuring positions displaced from each other by 120°. Then only three of the measurement value memories 13 and indicating instruments 14 are used. If the conductors 19 are stranded it is also possible to measure in the four positions as shown in FIG. 1 in the manner disclosed in connection with FIG. 1. But the measurement of the cable can also be carried out in such a manner that an oscillating rotating movement is imparted to the measuring head round the circumference of the cable in order to ascertain extrem measurement value thereby.

FIG. 6 shows a further application of the measuring device according to FIG. 1 and of a somewhat modified measuring device, respectively, for checking the insulating thickness on a sector conductor 19 according to FIG. 5. Contrary to the conventional cylindric conductors this conductor has an unequally bent surface. Therefore, an exact measurement requires a locally concentrated measuring field since otherwise the measurement result would not only depend on the thickness of the insulating layer and the distance of the measuring coil from the conductor, respectively, but also on the local curved of the conductor surface. The measuring head according to FIG. 1 is especially adapted for checking the insulation on such non-cylindric conductors having an unequally bent surface. Thereby the measurement is carried out in such a manner that the measuring head 1 is displaced along the circumference of the insulation, whereby the measurement value is continuously indicated. For this purpose a by-pass switch 20 can be provided as shown in FIG. 1 which permits to connect the output of the discriminator 9 to one of the indicating instruments either directly or through an amplifier not shown. Also in this case it is ascertained in which places extremum values of the insulating thickness occur in order to be able to adjust the manufacturing equipment accordingly if needed.

Whilst only the checking of cables has been discussed above obviously other objects could be checked in an according manner. Such, e.g., waveguides are often provided with insulating layers and it is off-hand possible to detect minima or maxima of this insulating thickness along predetermined surface lines of the waveguide. Thereby it is not only essential that extrem values can be stored and indicated but also that by means of the core 4 a measuring system having a relatively hgih resolving power is realized.

I claim:

1. A method for measuring extremum values of the thickness of a dielectric layer on electric conductor means including a conductor having a non-cylindric external surface or a plurality of stranded helically running conductors of a cable, said conductor means forming projecting portions, comprising the steps of providing a measuring pick-up, moving the measuring pick-up at least over a part of the surface of the object to be measured and over at least one of said projecting portions respectively, and thereby measuring the local values of the thickness of the layer, and storing at least one extremum value thereby measured in a memory and indicating such value.

2. A method according to claim 1, for measuring a cable with stranded conductors, wherein measurement is effected along several axial surface lines and at least one extremum value ascertained along each of the surface lines is separately stored and indicated.

3. A method according to claim 1, characterized in that the measuring pick-up is displaced within a range in which an extremum value is suspected.

4. A device for measuring extremum values of the thickness of a dielectric layer on electric conductor means having a non-cylindric external surface or a plurality of stranded helically running conductors of a cable, said conductor means forming projecting portions, having a measuring coil adapted to be approached to said layer and connected into a high-frequency measuring circuit, the reaction of said conductor means onto said measuring coil and measuring signal at the output of said high-frequency measuring circuit respectively depending on the thickness of said layer, a rod-shaped core in said coil, said core having a part projecting from said coil, said part having a length equal to at least double its greatest transverse dimension, the outer free end of said core being directed towards and adapted to be approached against said layer for detecting projecting portions of said conductor means by means of a concentrated field produced by said core, memory means for detecting extremum values of said measuring signal and means for indication of said extremum values.

5. A device for measuring an extremum value of the thickness of a dielectric layer on electric conductor means including a conductor having a non-cylindrical outer surface or a plurality of stranded helically running conductors of a cable, said conductor means forming projecting portions, comprising a measuring coil connected to a measuring circuit, means for approaching said measuring coil against said layer, means for producing a relative displacement between said coil and layer in order to scan said layer and projecting portions of said conductor means respectively, an output of said measuring circuit being connected to a resetable extremum-value memory, and at least one indicating instrument for display of extremum-values stored in said restable extremum-value memory.

6. A device according to claim 5, having a plurality of indicating instruments of which each is connected to a memory, and means selectively connecting one of these memories to said extremum-value memory.

7. A device according to claim 6, characterized in that each of the indicating instruments and the memory connected thereto respectively is associated with a measuring position of the measuring coil on the object to be measured, and that a selector switch for selectively connecting the memories to said resetable extremum-values memory is coupled with a position selector for the coil.

8. A device according to claim 7, characterized in that a resetting switch for said resetable extremum-value memory is controllable by the position selector in order to reset the extremum-value memory upon each change of position.

* * * * *